(12) United States Patent
Kanetake (10) Patent No.: US 7,108,729 B2
(45) Date of Patent: Sep. 19, 2006

(54) METHOD OF MAKING SOLID ELECTROLYTIC CAPACITOR HAVING OXIDIZED ANODE WIRE

(75) Inventor: Yasuo Kanetake, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 243 days.

(21) Appl. No.: 10/307,508

(22) Filed: Dec. 2, 2002

(65) Prior Publication Data

US 2004/0103508 A1 Jun. 3, 2004

(30) Foreign Application Priority Data

Nov. 29, 2001 (JP) ............................. 2001-364470

(51) Int. Cl.
  *H01G 9/00* (2006.01)
(52) U.S. Cl. ..................... 29/25.03; 361/523; 361/531
(58) Field of Classification Search ............... 29/25.03; 361/523, 531, 538, 540
See application file for complete search history.

(56) References Cited

U.S. PATENT DOCUMENTS 5,693,104 A  12/1997  Kuriyama ............... 29/25.03
5,818,687 A * 10/1998  Shimojima ............. 361/528
6,277,733 B1 * 8/2001  Smith .................... 438/636
6,459,565 B1 * 10/2002  Lessner et al. .......... 361/508

FOREIGN PATENT DOCUMENTS

JP          57141863 A  *  9/1982

* cited by examiner

*Primary Examiner*—H. Jey Tsai
(74) *Attorney, Agent, or Firm*—Michael Bednarek; Pillsbury Winthrop Shaw Pittman LLP (57) ABSTRACT

A solid electrolyte capacitor includes a capacitor element, an anode lead, and a cathode lead. The capacitor element includes a capacitor chip, an anode wire projecting from the capacitor chip, and a cathode electrode formed on outer surfaces of the capacitor chip. The anode lead is electrically connected to the anode wire, whereas the cathode lead is electrically connected to the cathode electrode. A method for making such a solid electrolyte capacitor includes a laser irradiation step for irradiating the anode wire with a laser beam, and a connection step for connecting the anode wire with the anode lead after the laser irradiation step.

11 Claims, 11 Drawing Sheets

METHOD OF MAKING SOLID ELECTROLYTIC CAPACITOR HAVING OXIDIZED ANODE WIRE

BACKGROUND OF THE INVENTION

1. Field of the Invention

The present invention relates to a method of making a capacitor, in particular a solid electrolyte capacitor. The present invention also relates to a method of processing a capacitor element incorporated in such a solid electrolyte capacitor.

2. Description of the Related Art

Figure 14:
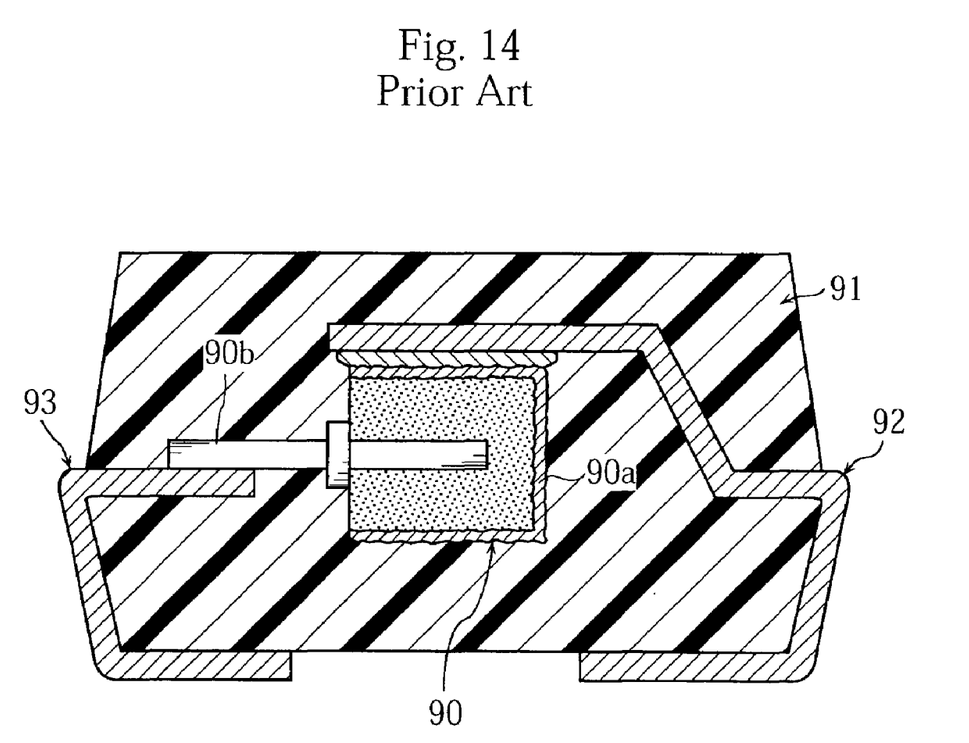
FIG. 14 is a sectional view showing a capacitor obtained by a conventional method of making.

FIG. 14 shows a known solid electrolyte capacitor (see e.g. U.S. Pat. No. 5,693,104) The solid electrolyte capacitor shown in FIG. 14 comprises a capacitor element 90 enclosed in a resin package 91. The resin package 91 also encloses part of external connection leads 92, 93. The remaining parts of the leads 92, 93 extend out of the resin package 91. One lead 92 (cathode lead) is connected to a cathode electrode 90a formed on the capacitor element 90, whereas the other lead 93 (anode lead) is connected to an anode wire. 90b extending out of the capacitor element 90. The anode lead 93 may be connected to the anode wire 90b by means of resistance welding or thermocompression bonding for example.

The capacitor element 90 is provided by forming a dielectric layer and a solid electrolyte layer in pores of a sintered porous mass, and then forming the cathode electrode 90a. The anode wire 90b is partially enclosed in the sintered porous mass. The anode wire 90b may be buried in the sintered porous mass before forming the solid electrolyte layer.

By burying the anode wire 90b in the sintered porous mass before the solid electrolyte layer is formed, however, the surface of the anode wire 90b are oxidized due to the heating treatment included in the forming process of the solid electrolyte layer. Further, the sintered porous mass is formed by sintering a compressed metal powder. If the anode wire 90b is buried before this sintering process, it becomes oxidized during that process. In any case, to connect the anode wire 90b and the anode lead 93, an oxidized film exists therebetween. Consequently, the oxidized film inhibits proper bonding (performed by compatibility, atomic diffusion or alloying) between the metal in the anode wire 90b and the metal in the anode lead 93 even if energy is applied to the connecting portion. The oxidized film may remain, for all the applied energy, at the boundary surface (interfacial alloyed layer) and weaken the connection between the anode wire 90b and the anode lead 93.

In order to eliminate the above problem, it has been proposed to remove the oxidized film on the anode wire by sandblasting or partially remove the oxidized film by making a cut in the anode wire. However, it becomes more difficult to perform these mechanical treatments as the downsizing of the capacitor element proceeds. Further, these mechanical treatments give a large load on the anode wire as well as the portion in the sintered mass where the anode wire is buried, which may lead to breakage of the anode wire or ill-conduction between the anode wire and the sintered mass (the main part of the element), thereby deteriorating electric characteristics. In particular, the anode wire becomes thinner in accordance with the downsizing of the capacitor element, whereby the ill conduction or the breakage of the anode wire is more likely to occur.

SUMMARY OF THE INVENTION

It is, therefore, an object of the present invention to provide a method of making a capacitor, particularly a solid electrolyte capacitor while eliminating or at least reducing the above-described problems.

Another object of the present invention is to provide a method of processing a capacitor element incorporated in such a capacitor with advantages.

According to a first aspect of the present invention, there is provided a method for making a capacitor that comprises: a capacitor element including a first and a second electrodes; a first lead electrically connected to the first electrode; and a second lead electrically connected to the second electrode. The method comprises: a laser irradiation step for irradiating the first electrode with a laser beam; and a connection step for connecting the first electrode to the first lead after the laser irradiation step.

In a preferred embodiment, the first electrode may comprise a metal wire on which an oxidized film is formed. The laser irradiation in the laser irradiation step may be continued until at least a part of the oxidized film is removed and a metal surface of the wire is exposed.

Preferably, in the connection step, the exposed metal surface of the wire may be held in contact with the first lead, and energy is applied to the contact portion.

Preferably, in the laser irradiation step, selective removal maybe performed exclusively with respect to a portion on the wire that comes into contact with the first lead.

Preferably, the connection step may employ resistance welding.

According to a second aspect of the present invention, there is provided a method for making a solid electrolyte capacitor. The capacitor comprises: a capacitor element including an element chip, an anode wire projecting from the element chip, and a cathode electrode formed on outer surfaces of the element chip; an anode lead electrically connected to the anode wire; a cathode lead electrically connected to the cathode electrode; and a resin package enclosing the capacitor element, a portion of the anode lead, and a portion of the cathode lead. The method of making the capacitor comprises: a laser irradiation step for irradiating the anode wire with a laser beam; and a connection step for connecting the anode wire to the anode lead after the laser irradiation step.

In a preferred embodiment, the anode wire may be formed with an oxidized film. In the laser irradiation step, the laser irradiation may be continued until at least a part of the oxidized film is removed and a metal surface of the wire is exposed.

Preferably, in the connection step, the exposed metal surface of the anode wire may be held in contact with the anode lead, and energy may be applied to the contact portion.

Preferably, in the laser irradiation step, selective removal may be performed exclusively with respect to a portion on the wire that comes into contact with the first lead.

Preferably, the connection step may employ resistance welding.

According to a third aspect of the present invention, there is provided a method of processing a capacitor element comprising: an element chip; an anode wire projecting from the element chip and including a surface formed with an oxidized film; and a cathode electrode formed on an outer surface of the element chip. The method may comprise a step of: removing at least a part of the oxidized film on the anode wire by laser irradiation.

Other objects, features, and advantages invention will become clearer from the description of the embodiment given below with reference to the accompanying drawings.

BRIEF DESCRIPTION OF THE DRAWINGS

FIG. 4b is a sectional view taken along IVb—IVb in FIG. 4a.

FIG. 5b is a sectional view taken along Vb—Vb in FIG. 5a.

DETAILED DESCRIPTION OF THE PREFERRED EMBODIMENTS

Preferred embodiments of the present invention will be described below with reference to the accompanying drawings.

Figure 1:
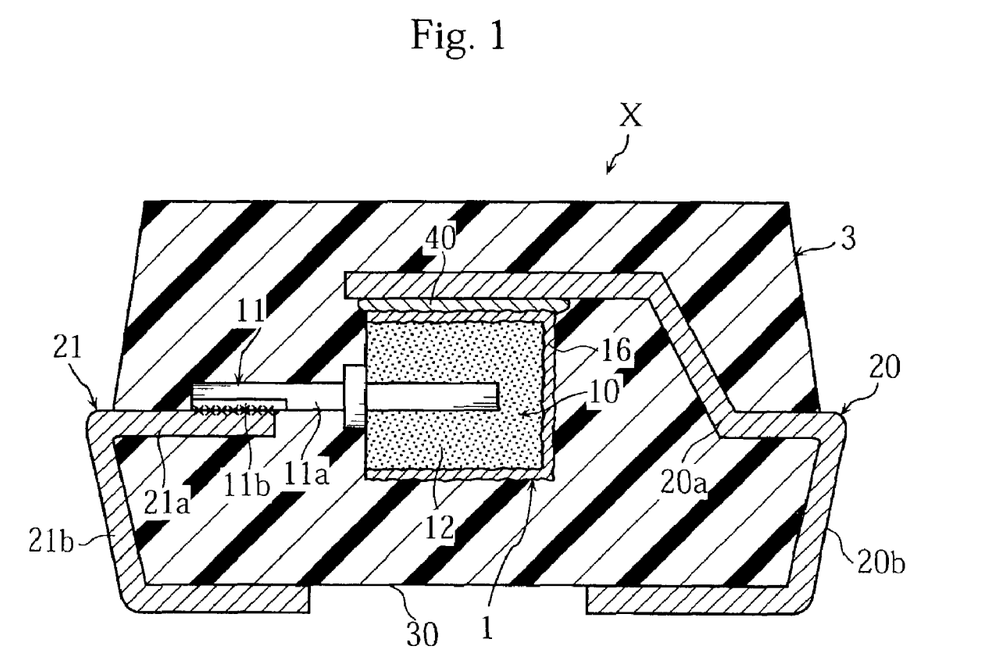
FIG. 1 is a sectional view showing a capacitor obtained by a fabrication method according to the present invention.

Referring to FIG. 1, a capacitor X comprises a capacitor element 1 and leads 20, 21 for external connection. The capacitor element 1 is enclosed in a resin package 3. The external connection leads 20, 21 are distinguished as needed hereinafter by being referred to as "cathode lead" and "anode lead", respectively.

The leads 20, 21, respectively, include inner lead portions 20a, 21a enclosed in the resin package 3 as well as outer lead portions 20b, 21b extending out of the resin package 3. The outer lead portions 20b, 21b are cranked so that their ends extend horizontally on a bottom surface 30 of the resin package 3. With this arrangement, it is possible to surface-mount the capacitor X on a circuit board for example.

Figure 2:
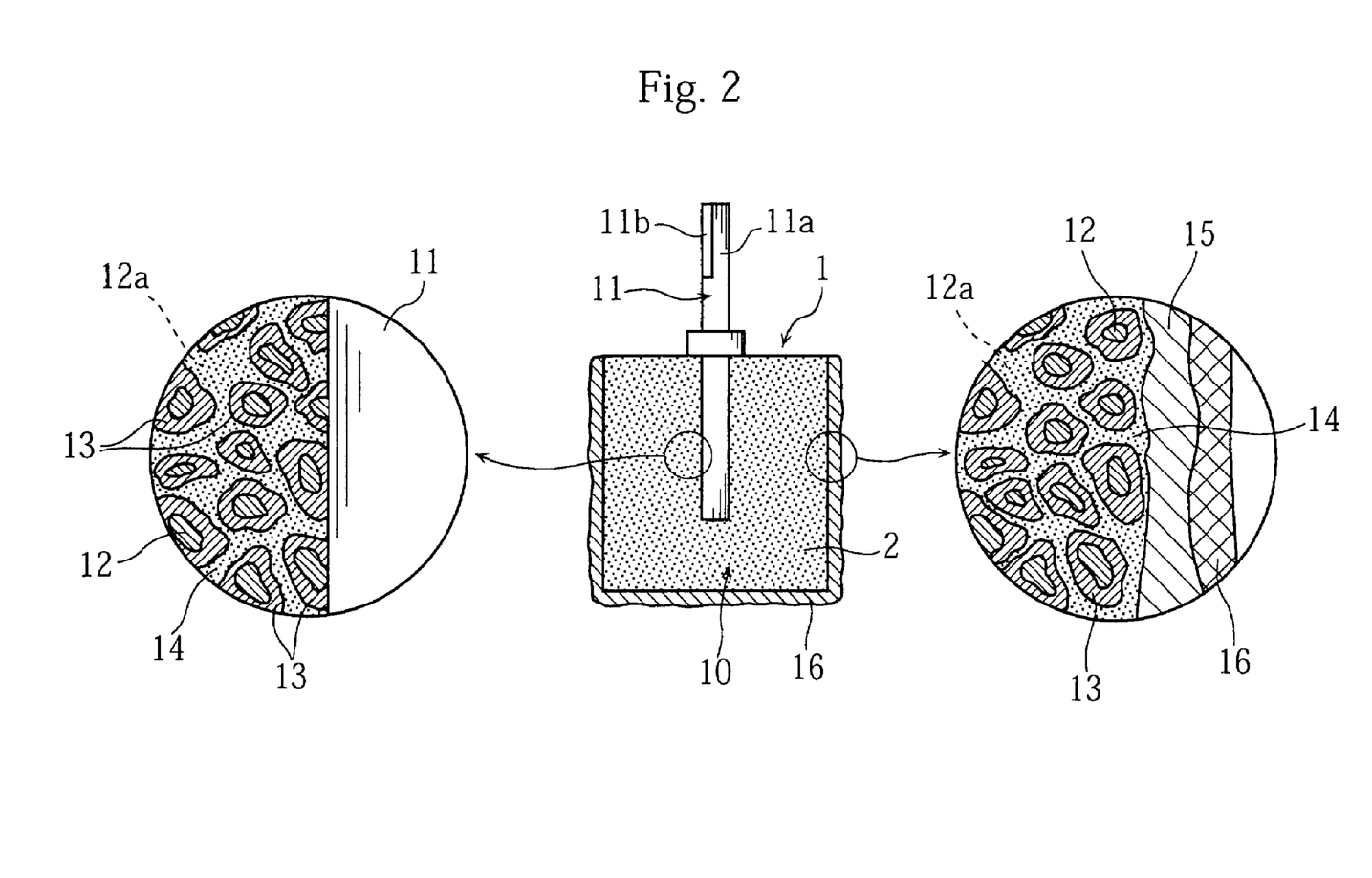
FIG. 2 is a sectional view showing a capacitor element of the capacitor in FIG. 1.

As shown in FIG. 2, the capacitor element 1, which may be a solid electrolytic capacitor element, includes a capacitor chip 10 and an anode wire 11 projecting therefrom. The capacitor chip 10 comprises a sintered porous mass 12 including pores 12a filled with dielectric layers 13 and solid electrolyte layers 14. The outer surface of the sintered porous mass 12 is formed with a buffer layer 15 for a cathode electrode 16 to be laminated thereon.

For forming the sintered porous mass 12, metal powder of e.g. tantalum, aluminum or niobium, which works as valve, is compressed into a cube, and then sintered under high vacuum.

The dielectric layer 13 may be of an oxidized metal comprised in the sintered porous mass 12. The dielectric layer 13 maybe formed by performing anodic oxidation (or by chemical treatment).

The solid electrolyte layer 14 is formed in the remaining pores of the sintered porous mass 12 after the dielectric layer 13 is formed. The solid electrolyte layer 14 may be formed by immersing the sintered porous mass 12 in an aqueous solution of manganese nitrate for impregnation, followed by a heating treatment. Preferably, the solid electrolyte layer 14 thoroughly fills the pores 12a of the sintered porous mass 12. For this, normally the impregnation and heating treatment is performed repetitively.

The buffer layer 15, which may be made of a graphite, is provided for reducing the contact resistance between the solid electrolyte layer 14 and the cathode electrode 16. For example, the buffer layer 15 is provided when the solid electrolyte layer 14 is made of $MnO_2$ while the cathode electrode 16 is of silver. In this way, the buffer layer 15 is provided as needed.

As illustrated in FIG. 1, the cathode electrode 16 is connected to the inner lead portion 20a of the cathode lead 20 with the aid of a conductive bond 40. The cathode lead 16 may be formed by silver-plating. As for the conductive bond 40, a silver paste or a solder paste may be employed.

The anode wire 11 is made of a metal with one end buried integrally in the sintered porous mass 12. The anode wire 11 may be made of the same metal as the one used for forming the sintered porous mass 12. The anode wire 11 is connected to the inner lead portion 21a of the anode lead 21.

In making the capacitor element 1, the surface of the anode wire 11 may be oxidized by the sintering process of a compressed mass or the heating treatment performed for forming the solid electrolyte layer 14. Consequently an oxidized film 11a is formed on the surface of the anode wire 11. This oxidized film 11a is partially removed by laser irradiation, as described later, to expose a core conductor 11b. The thus obtained exposed portion 11c helps the anode wire 11 connect to the inner lead portion 21a of the anode lead 21.

The capacitor X may be obtained in the following manner.

Figure 3:
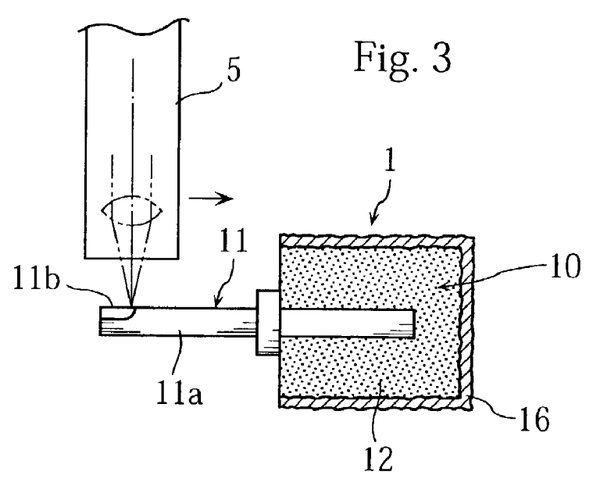
FIG. 3 is a view illustrating a laser irradiation step.
Figure 4A:
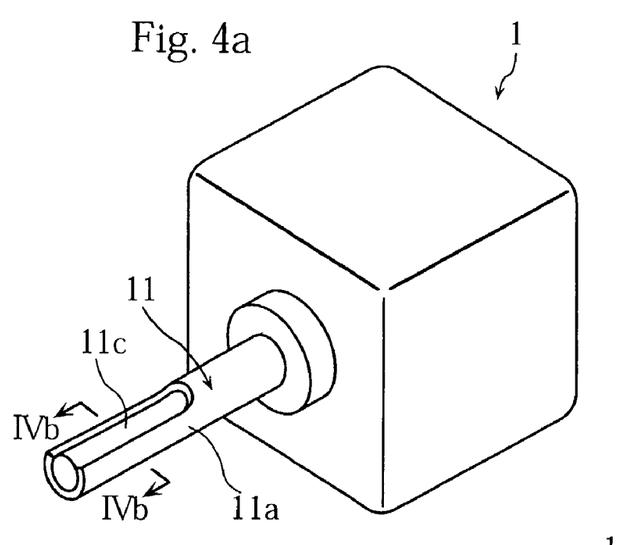
FIG. 4a is a perspective view showing the entity of the capacitor element after the laser irradiation.
Figure 4B:
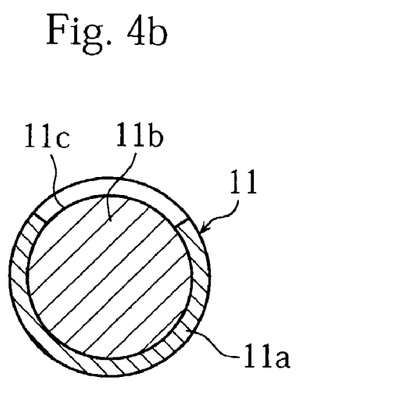
Figure 5A:
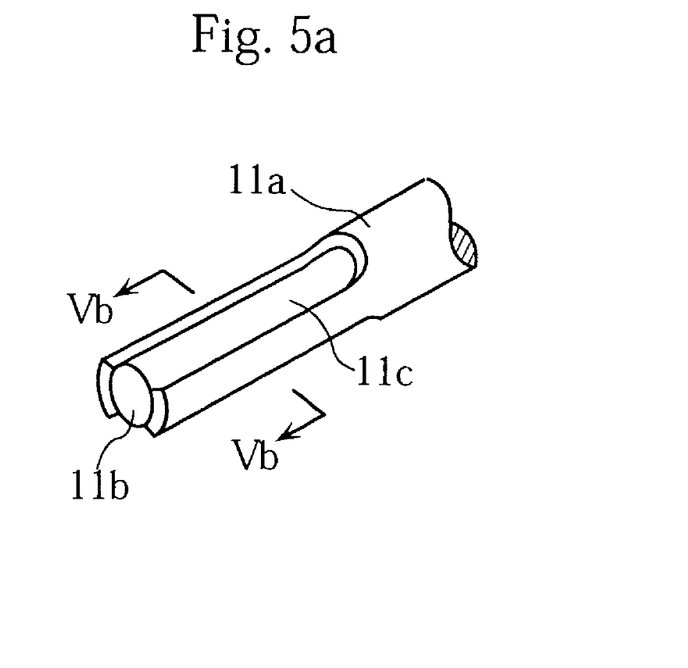
FIG. 5a is a perspective view showing a principal portion of another capacitor element after the laser irradiation.
Figure 5B:
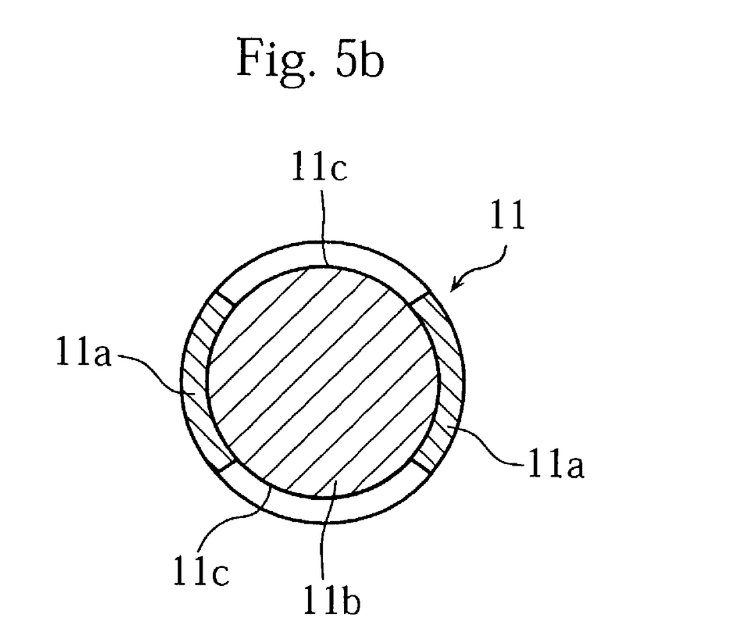

First, as shown in FIG. 3, the anode wire 11 of the capacitor element 1 is subjected to a laser irradiation (laser irradiation step). The laser irradiation removes the oxidized film 11a formed on the surface of the anode wire 11, thereby exposing the core conductor 11b. The laser irradiation is performed by generating a laser beam with a scan head 5 of a laser oscillator for scanning the anode wire 11 longitudinally thereof as indicated by an arrow in FIG. 3. In this way, the exposed portion 11c is formed longitudinally of the anode wire 11 as shown in FIGS. 4a and 4b. As shown in FIGS. 5a, 5b, the oxidized film 11 may be removed from two opposite portions across the diameter. In order to save time by an efficient laser irradiation, however, it is preferable to perform the removal of the oxidized film 11 only with a portion used for connection to the anode lead 21 (FIGS. 4a and 4b).

There is no mechanical load (external force) on the anode wire 11 during the laser irradiation. In other words, no external force is given to the anode wire 11 unlike the case where the oxidized film is removed by sandblasting or by making a cut in an inner electrode of the anode wire. Consequently, no load is imposed on the portion of the capacitor element 1 where the anode wire 11 is connected, which avoids deterioration in electric characteristics that would otherwise arise from the load. In addition, even if the anode wire 11 is downsized in accordance with the size reduction of the capacitor element 1, the laser irradiation onto the anode wire 11 can still be performed properly by reducing the diameter of the laser spot. In this point, it can be said that the present invention provides a technique adaptive for size reduction of the capacitor element 1 or the capacitor x.

Various kinds of lasers are known and can be utilized for the laser irradiating device. A preferable one may be a YAG laser. When the YAG laser is used, the wavelength of the laser beam for irradiating the anode wire 11 is set to be 1000-1400 nm, for example. As in the wavelength of the laser beam, the irradiation period of the laser beam can be arbitrarily determined as long as the desired objective is achieved.

The laser irradiation can be utilized for roughening the surface of an anode electrode. In this case, the laser irradiation is performed, even if no oxidized film is formed on the surface of the anode electrode, or after the removal of the oxidized film is performed.

Figure 6:
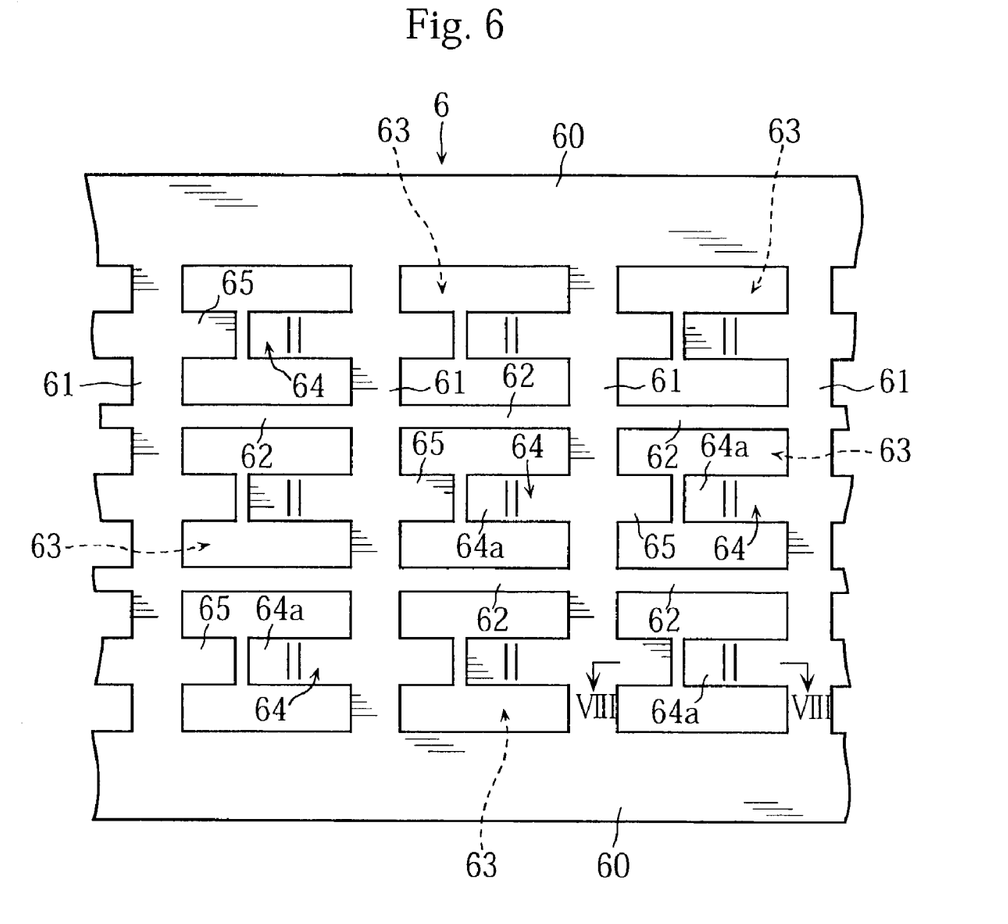
FIG. 6 is a plan view showing a principal portion of a lead frame used in the method of making according to the present invention.
Figure 7:
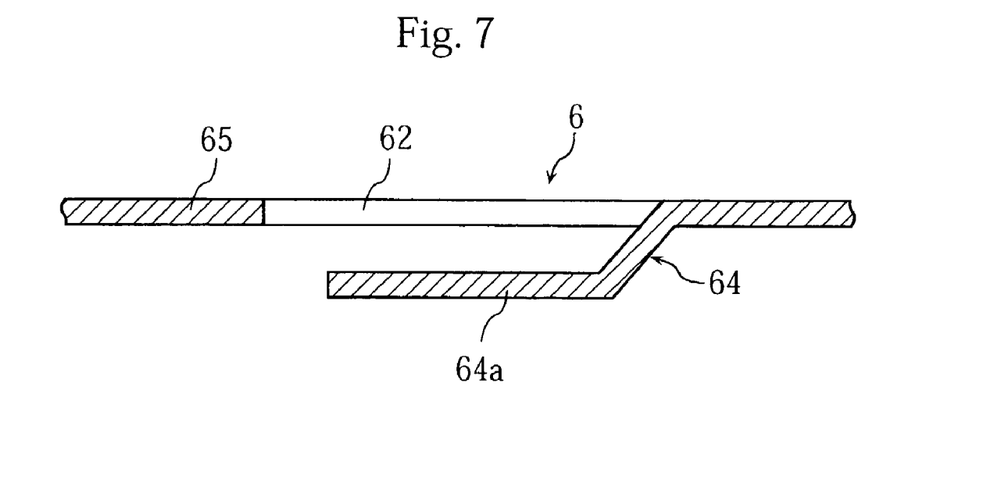
FIG. 7 is a sectional view taken along VIII—VIII in FIG. 6.

Next, the mounting process of the capacitor element 1 is performed. This process utilizes a lead frame 6 shown in FIG. 6. The lead frame 6 includes a pair of sidebars 60 and a plurality of crossbars 61 bridging between the sidebars 60. The sidebars 60 and the crossbars 61 surround regions which are zoned by partition bars 62, and each of the zoned regions makes a capacitor mounting zone 63. Each of the crossbars 61 includes first and second conductor pieces 64, 65 directing toward the adjacent crossbars 61. As shown in FIG. 7, each of the first conductor pieces 64 includes an end portion 64a which is set low.

Figure 8:
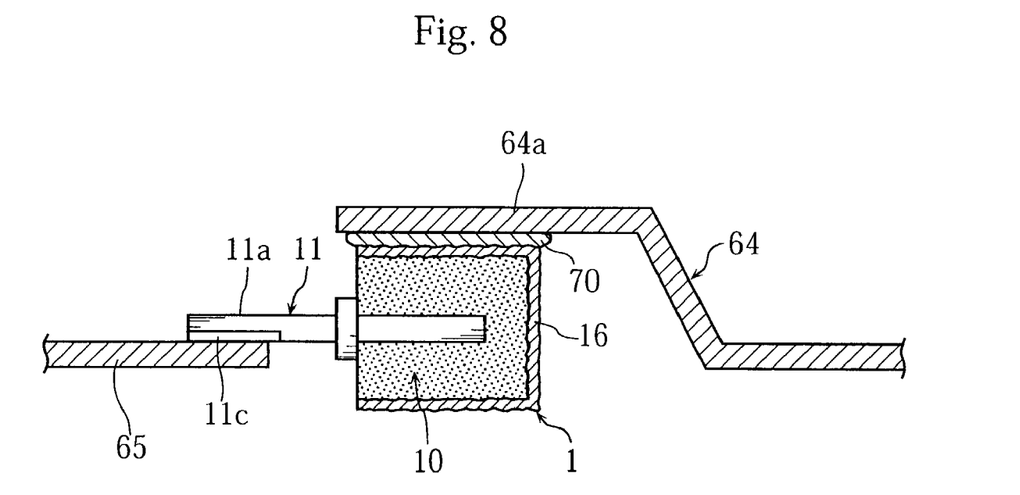
FIG. 8 is a sectional view of a principal portion illustrating a mounting step of the capacitor element.
Figure 9:
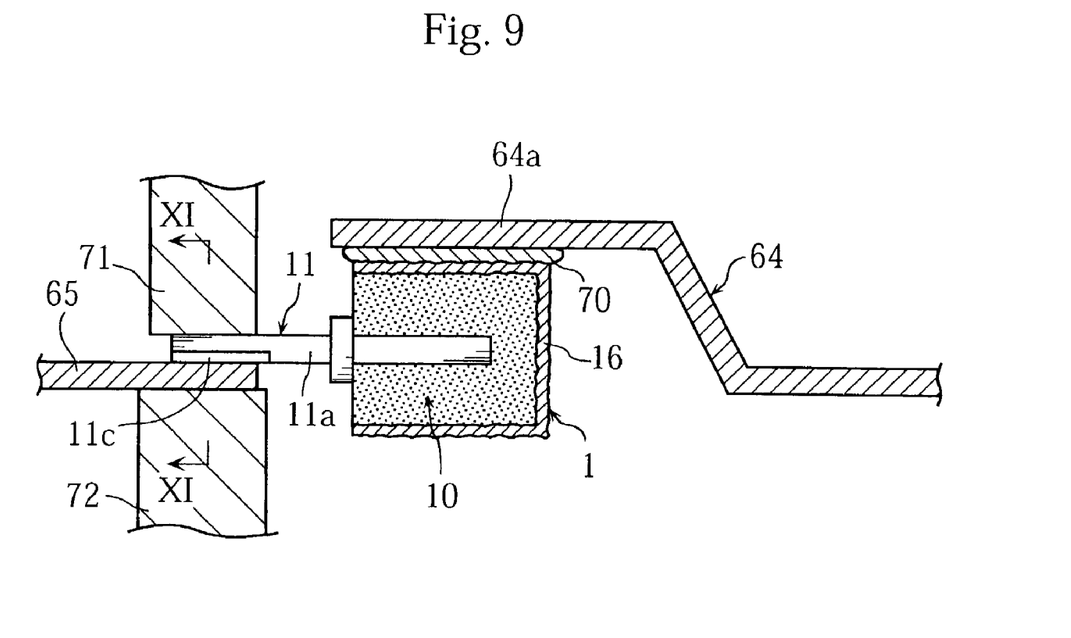
FIG. 9 is a sectional view of a principal portion illustrating a connection step of an anode wire.
Figure 10:
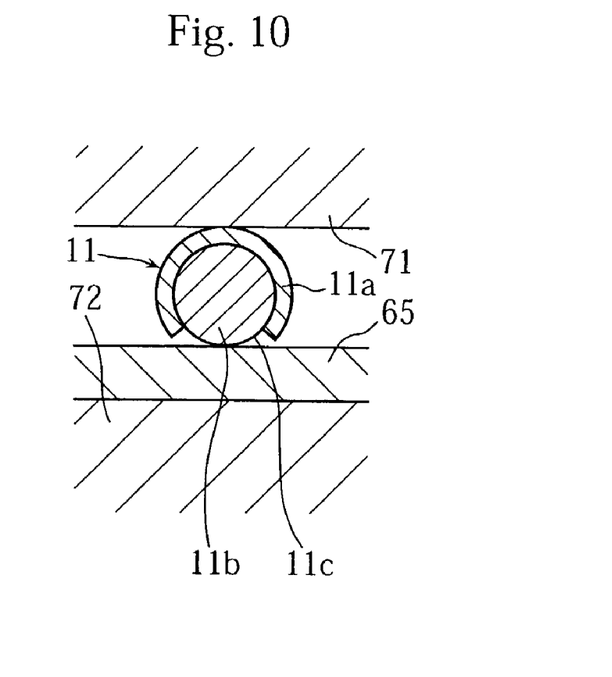
FIG. 10 is a sectional view taken along XI—XI in FIG. 9.

As shown in FIG. 8, the mounting process of the capacitor element 1 is performed with the use of a conductive bond 70. Specifically, the conductive bond 70 is applied on the end portion 64a of the first conductor piece 64, and the capacitor element 1 is mounted thereon so as to locate the capacitor chip 10 on the end portion 64a, followed by curing or hardening of the conductive bond 70. In this way, the capacitor element 1 is mounted on the first conductor piece 64 with the cathode electrode 16 conductive to the first conductor piece 64. At this stage, as shown in FIGS. 9 and 10, it is preferable that the uncovered conductor 11b of the anode wire 11 is in contact with the second conductor piece 65. For the conductive bond 70, a silver paste or a solder paste is employed for example.

Subsequently, the connection of the anode wire 11 is performed. As shown in FIGS. 9 and 10, this process step includes resistance welding performed by employing a pair of electrodes 71, 72. Specifically, the electrodes 71, 72 sandwich the anode wire 11 together with the second conductor piece 65 while the exposed portion 11c of the anode wire 11 and the second conductor piece 65 are in contact to each other. Then, a current is passed through the portion where they are in contact.

Instead of the resistance welding, other methods may be employed for connecting the anode wire 11. For example, the conductive bond applied in the mounting of the capacitor element 1 maybe utilized, or non-electric energy such as heat or ultrasonic wave may be applied for connecting the anode wire 11 and the second conductor piece 65.

The anode wire 11, with the oxidized film 11a removed, is connected to the second conductor piece 65 by applying energy to the connecting portion. The absence of the oxidized film ensures compatibility or facilitates atomic dispersion at the connecting portion. Also, the connection can be made properly with a conductive bond in the presence of a restricted amount of oxidized material between the conductive bond and the inner electrode. Therefore, regardless of the method employed, the removal of the oxidized film 11a from the anode wire 11 serves to strengthen the connection between the anode wire 11 and the second conductor piece 65. Regarding the surface roughening for the anode wire 11 by the laser irradiation, it increases the surface area of the anode wire 11 and improves the wetting characteristics thereof, thereby contributing to the connection enhancement between the anode wire 11 and the second conductor piece 65.

The dimensions (thickness, for example) of the oxidized film 11a formed on the anode wire 11 are irregular for the respective capacitor elements 1. Accordingly, the presence of the oxidized film 11a on the anode wire 11 causes irregularities in the amount of the current passing through the respective second conductor pieces 65 for the inner electrode connection. As a result, the connecting strength between the anode wire 11 and the second conductor piece 65 varies for the respective capacitor elements 1. The experiment carried out by the inventor of the present invention showed that the strength irregularity becomes more noticeable as the amount of the oxidized film 11a left on the anode wire 11 is smaller. Thus, the removal of the oxidized film 11a is preferably restricted to a small extent, as shown in FIGS. 4a and 4b, for restraining the irregularity of the connecting strength.

Figure 11:
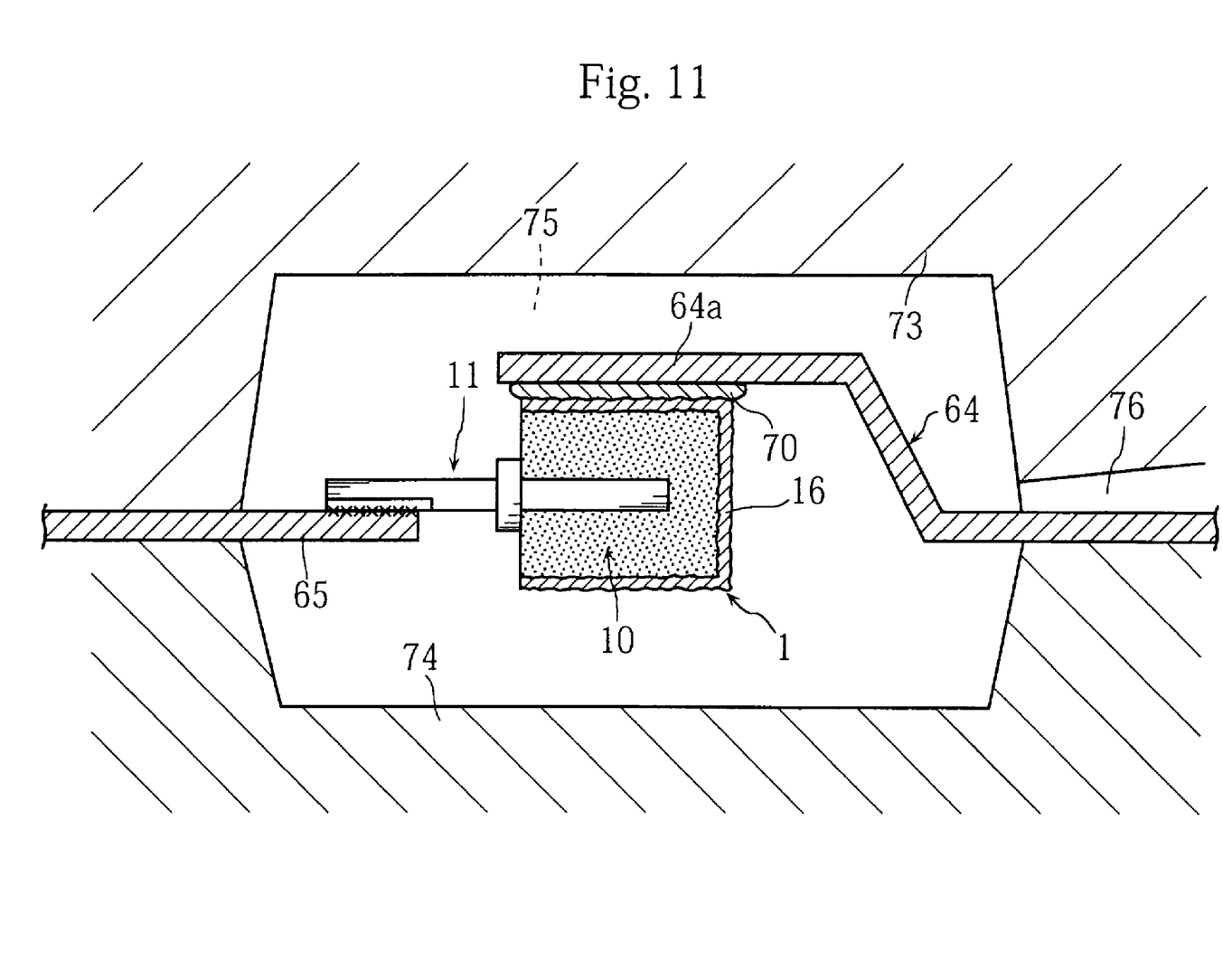
FIG. 11 is a sectional view of a principal portion illustrating a resin packaging step where molds are utilized.
Figure 12:
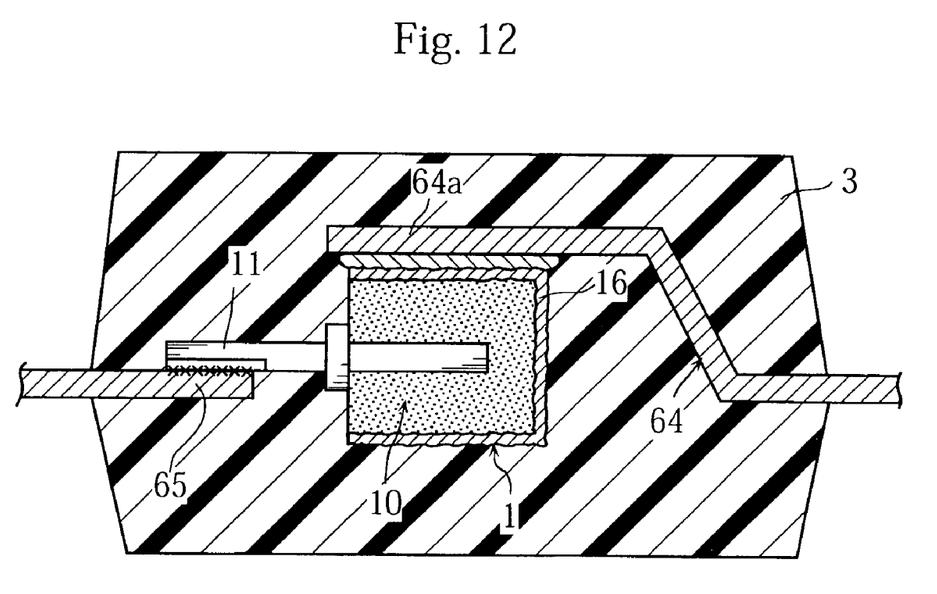
FIG. 12 is a sectional view showing the capacitor immediately after taken out of the molds.

Next, the resin packaging process is performed. In this process, use is made of an upper and a lower molds 73, 74 as shown in FIG. 11. The upper and the lower molds 73, 74 make a cavity 75 when they are clamped. For resin packaging, the capacitor element 1 is placed within the cavity 75, which is then filled with a resin poured through a gate 76. The resin may be a thermosetting resin such as epoxy resin. The resin inside the cavity 75 is hardened or solidified, and then the molds are opened for providing the capacitor element 1 enclosed in the resin package 3 as shown in FIG. 12.

Thereafter, the capacitor X shown in FIG. 1 is obtained by cutting the first and the second conductor pieces 64, 65 and then bending the conductor pieces (leads 20, 21 in FIG. 1) extending outside the resin package 3.

Figure 13:
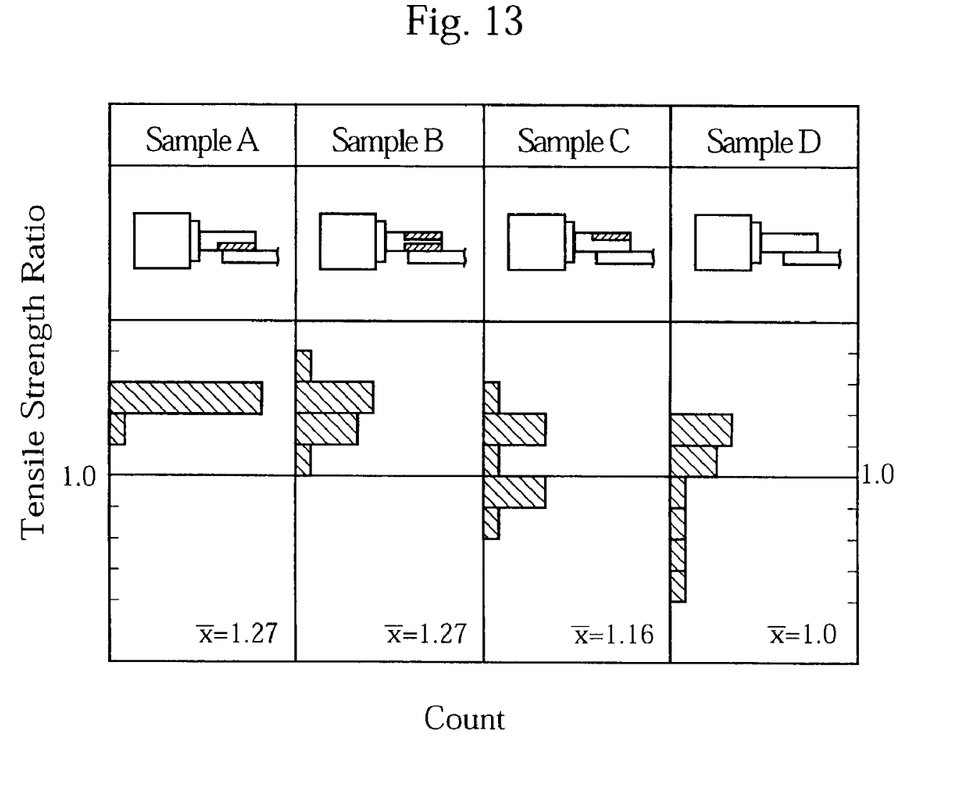
FIG. 13 is a graph showing results of an experiment.

The inventor of the present invention carried out an experiment for comparison of samples (sample groups A-C) and other samples (sample group D) on the tensile strength at the connecting portion of the anode wire and the lead frame, the former samples being prepared by removing the oxidized film on the anode wire by the YAG laser for exposure of the conductor surface, which was then connected to the lead frame, the latter samples being prepared without removing the oxidized film from the anode wire before connected to the lead frame. The results are shown in FIG. 13. Each group consists of eleven samples. The tensile strength is presented in ratio relative to the oxidized film-intact sample group D whose average is 1.

The oxidized film was removed from the anode wire in three ways, that is, from the lead frame side only (sample group A), from the lead frame side and the opposite side (sample group B), and from the opposite side of the lead frame only (sample group C). Resistance welding was employed for connecting the anode wire to the lead frame. Welding conditions (flow amount of the current, period of current flow, used electrode) were the same for the respective samples.

As seen from FIG. 13, the average tensile strength is greater in the film-removed sample groups A-C than in the film-intact sample group D. Especially, the average tensile strength ratios of the sample groups A, B are high. From these results, it is known that the connection between the anode wire and the lead frame is performed well when the oxidized film is removed at least from the lead frame side.

Further, a variation in the tensile strength is observed in each of the groups A-D, and the variations are smaller in the film-removed sample groups A-C than in the film-intact sample group D. In particular, the variation of the tensile strength is very small in the sample group A where the oxidized film is removed from the lead frame side only.

In summary, the partial removal of the oxidized film using a laser ensures great and stable tensile strength (connecting strength) for connection to the lead frame. For reliable effects, the removal is performed with respect to the oxidized film on the lead frame side (the connecting side) only.

The preferred embodiments of the present invention being thus described, it is obvious that the same may be varied in various ways. Such variations should not be regarded as a departure from the spirit and scope of the invention, and all such variations as would be obvious to those skilled in the art are intended to be included within the scope of the claims given below.

The invention claimed is:

1. A method for making a capacitor comprising: a capacitor element including a first and a second electrodes, the first electrode comprising a metal wire covered with an oxide film, the capacitor element further including an element chip from which the metal wire projects; a first lead electrically connected to the first electrode; and a second lead electrically connected to the second electrode; the method comprising:
    a laser irradiation step of irradiating the metal wire with a laser beam for removing part of the oxide film from a tip end of the metal wire to a portion short of the element chip to partially expose a metal surface of the metal wire; and
    a connection step of connecting the metal wire to the first lead after the laser irradiation step.

2. The method according to claim 1, wherein the partial removal of the oxide film provides a radially open cutout, the exposed metal surface of the metal wire projecting radially outward beyond the cutout.

3. The method according to claim 2, wherein in the connection step, the exposed metal surface of the wire is held in contact with the first lead, and energy is applied to the contact portion.

4. The method according to claim 3, wherein in the laser irradiation step, selective removal is performed exclusively with respect to a portion on the wire that comes into contact with the first lead.

5. The method according to claim 3, wherein the connection step employs resistance welding.

6. A method for making a solid electrolyte capacitor comprising:
    a capacitor element including an element chip, an anode wire projecting from the element chip and covered with an oxide film, and a cathode electrode formed on outer surfaces of the element chip;
    an anode lead electrically connected to the anode wire;
    a cathode lead electrically connected to the cathode electrode; and
    a resin package enclosing the capacitor element, a portion of the anode lead, and a portion of the cathode lead;
    wherein the method comprises:
    a laser irradiation step of irradiating the anode wire with a laser beam for removing part of the oxide film from a tip end of the anode wire to a portion short of the element chip to partially expose a metal surface of the anode wire; and
    a connection step of connecting the anode wire to the anode lead after the laser irradiation step.

7. The method according to claim 6, wherein the partial removal of the oxide film provides a radially open cutout, the exposed metal surface of the anode wire projecting radially outward beyond the cutout.

8. The method according to claim 7, wherein in the connection step, the exposed metal surface of the anode wire is held in contact with the anode lead, and energy is applied to the contact portion.

9. The method according to claim 8, wherein in the laser irradiation step, selective removal is performed exclusively with respect to a portion on the wire that comes into contact with the first lead.

10. The method according to claim 8, wherein the connection step employs resistance welding.

11. A method of processing a capacitor element comprising: an element chip; an anode wire projecting from the element chip and including a surface formed with an oxide film; and a cathode electrode formed on an outer surface of the element chip; the method comprising a step of:
    removing part of the oxide film from a tip end of the anode wire to a portion short of the element chip to partially expose a metal surface of the anode wire by laser irradiation.

* * * * *